(12) United States Patent
Riedinger et al.

(10) Patent No.: US 10,190,664 B2
(45) Date of Patent: Jan. 29, 2019

(54) TRANSMISSION DRIVE UNIT OF A SEAT ADJUSTING DEVICE

(71) Applicant: Robert Bosch GmbH, Stuttgart (DE)

(72) Inventors: Markus Riedinger, Lichtenau-Ulm (DE); Andreas Stock, Karlsruhe (DE); Gilles Peter, Morsbronn les Bains (FR); Christof Angerer, Lauf (DE); Allan Dassaev Cadena Lopez, Toluca (MX); Luis Angel Ramirez Ortiz, Toluca (MX)

(73) Assignee: Robert Bosch GmbH, Stuttgart (DE)

( * ) Notice: Subject to any disclaimer, the term of this patent is extended or adjusted under 35 U.S.C. 154(b) by 446 days.

(21) Appl. No.: 14/927,424

(22) Filed: Oct. 29, 2015

(65) Prior Publication Data
US 2016/0123444 A1 May 5, 2016

(30) Foreign Application Priority Data
Oct. 29, 2014 (DE) .................. 10 2014 222 106

(51) Int. Cl.
*B60N 2/02* (2006.01)
*B60N 2/16* (2006.01)
*F16H 25/20* (2006.01)

(52) U.S. Cl.
CPC .......... *F16H 25/20* (2013.01); *B60N 2/0232* (2013.01); *B60N 2/166* (2013.01); *B60N 2002/0236* (2013.01); *F16H 2025/209* (2013.01); *F16H 2025/2031* (2013.01); *F16H 2025/2084* (2013.01)

(58) Field of Classification Search
CPC ..... F16H 2025/2031; F16H 2025/2093; B60N 2002/0236
See application file for complete search history.

(56) References Cited

U.S. PATENT DOCUMENTS

| | | | | |
|---|---|---|---|---|
| 2,966,069 | A * | 12/1960 | Wise | B60N 2/0224 16/354 |
| 7,571,666 | B2 | 8/2009 | Borbe et al. | |
| 2004/0089784 | A1* | 5/2004 | Garrido | B60N 2/0224 248/424 |
| 2005/0253036 | A1* | 11/2005 | Li | B60N 2/0232 248/424 |
| 2006/0278037 | A1* | 12/2006 | Borbe | B60N 2/0232 74/640 |
| 2007/0108360 | A1* | 5/2007 | Ito | B60N 2/067 248/424 |
| 2010/0237216 | A1 | 9/2010 | Napau et al. | |

(Continued)

FOREIGN PATENT DOCUMENTS

DE 102010043974 5/2012
EP 759374 2/1997

*Primary Examiner* — Terence Boes
(74) *Attorney, Agent, or Firm* — Michael Best & Friedrich LLP (57) ABSTRACT

A transmission drive unit of a seat adjusting device, comprising an electrical drive motor (2), a spindle drive (3) comprising a spindle (30) which is able to be driven by the drive motor (2), a nut (31) which is connected to a first seat component, and a housing (4), wherein the housing (4) is produced from a plastic material, the housing (4) comprises a first interface (5) for attaching to a second seat component, and the housing (4) comprises a first bearing surface (7) for bearing the spindle (30) of the spindle drive (3).

21 Claims, 5 Drawing Sheets

(56) References Cited

U.S. PATENT DOCUMENTS

2013/0169015 A1* 7/2013 Perraut .................... B60N 2/23
          297/313
2014/0260730 A1* 9/2014 Wu ........................ F16H 25/20
          74/89.23

* cited by examiner

TRANSMISSION DRIVE UNIT OF A SEAT ADJUSTING DEVICE

BACKGROUND OF THE INVENTION

The present invention relates to a transmission drive unit of a seat adjusting device for vehicles.

Such a transmission drive unit is disclosed, for example, in DE 10 2010 043 974 A1. This unit comprises a two-part housing having a first housing part made of plastics and a second housing part made of metal. The transmission drive unit in this case is fixed to a seat component via the second housing part which is produced from metal. This has proved to be a drawback, however, in that noises from the drive motor of the transmission drive unit may be transmitted to the seat due to the metal material which is in contact with the seat component. As a result, in particularly disadvantageous conditions noises may be transmitted to the seat and intensified during an adjustment procedure. As a result, the user feels uncomfortable as the noises imply an imminent risk of failure of the adjusting drive, which however is not the case. It is also possible for the transmission drive unit to be mounted incorrectly due to the two housing parts, which leads to rejected components during the production process which is not desirable. Therefore, it would be preferable to provide a simple and cost-effective solution for this problem area.

SUMMARY OF THE INVENTION

The transmission drive unit according to the invention of a seat adjusting device has the advantage relative to the prior art of cost-effective and simple production and the avoidance of the transmission of noises from the drive motor to the seat. This is achieved according to the invention in that the transmission drive unit comprises an electrical drive motor and a spindle drive as well as a housing made of plastics material. The housing comprises an interface for attaching to a seat component of a vehicle manufacturer and a first bearing surface for bearing a spindle of the spindle drive. As the interface on the housing according to the invention is now produced from a plastics material, the transmission of noise from the electrical drive motor to the seat is prevented. In this case, no additional components have to be provided for damping noise or the like.

Preferably, the housing comprises a second bearing surface which bears an output shaft of the drive motor. As a result, the housing is able to undertake even more functions so that the number of components of the transmission drive unit may be further reduced.

Moreover, the transmission drive unit preferably comprises a transmission cover made from plastics. This cover also contributes to the noise reduction and permits cost-effective production.

The transmission cover is particularly preferably fixed to the plastics housing by means of a first metal screw bolt and a second metal screw bolt. In this case, a longitudinal axis of the spindle of the spindle drive intersects in a perpendicular manner a plane in which the two screw bolts are located. As a result, a particularly compact construction of the transmission drive unit is achieved.

For increased stability, the two screw bolts preferably extend over the entire width of the housing.

Further preferably, the screw bolts in the longitudinal direction of the spindle are arranged between a spindle end (threaded end of the spindle) and the bearing of the spindle in the housing. As a result, for example in the event of an accident, forces acting on the transmission drive unit may be easily transmitted from the seat into the vehicle structure, without the housing or other components of the transmission drive unit breaking.

Preferably, the unit further comprises a worm gear-axial stop which is arranged on the spindle. A partial, preferably complete, covering is present in the axial direction between the first and second screw bolts and the worm gear-axial stop. As a result, in the case of tensile or compressive loading, for example in the case of an accident, forces may be more easily absorbed without the seat being detached from the vehicle body.

For further increased stability, the transmission drive unit further preferably comprises a reinforcing element, in particular a cage, in particular made of metal, arranged on an outer face of the housing. The reinforcing element is particularly preferably C-shaped and has a first and second end region. The two screw bolts in this case are particularly preferably arranged such that they extend through openings in the first and second end regions of the reinforcing element. The stability of the transmission drive unit, in particular in the case of an accident, may also be increased thereby.

The present invention further comprises a seat of a vehicle comprising a transmission drive unit according to the invention. The transmission drive unit is in this case preferably a unit for adjusting the height of the seat. Alternatively, the transmission drive unit is a unit for adjusting further planes of the seat.

Further preferably, in the present invention, the reinforcing element is configured to be substantially C-shaped with a first end region and a second end region, wherein the two screw bolts connect the two end regions together. Particularly preferably, a transition fit or clearance fit is formed between the reinforcing element and the one-piece housing so that no forces are able to be transmitted to the housing from the reinforcing element.

According to a further preferred embodiment of the invention, the unit further comprises a disk-shaped support component, in particular made of metal. The support component together with the reinforcing element encloses the plastics housing. The reinforcing element and the disk-shaped support component, therefore, form a cage in order to enclose the plastics housing, wherein the cage is able to absorb forces in the longitudinal axis of the spindle.

In order to absorb, in particular, oscillations and vibrations through the cage, the disk-shaped support element preferably has a spring region. The spring region is preferably a bead in the disk-shaped support element.

Further preferably, the reinforcing element and the disk-shaped support element are connected by means of screw bolts or the like extending in the axial direction of the spindle. In this case the spindle extends through the disk-shaped support element. The disk-shaped support element is preferably of U-shaped configuration.

BRIEF DESCRIPTION OF THE DRAWINGS

A preferred exemplary embodiment of the invention is described in detail hereinafter with reference to the accompanying drawings, in which.

DETAILED DESCRIPTION

Figure 1:
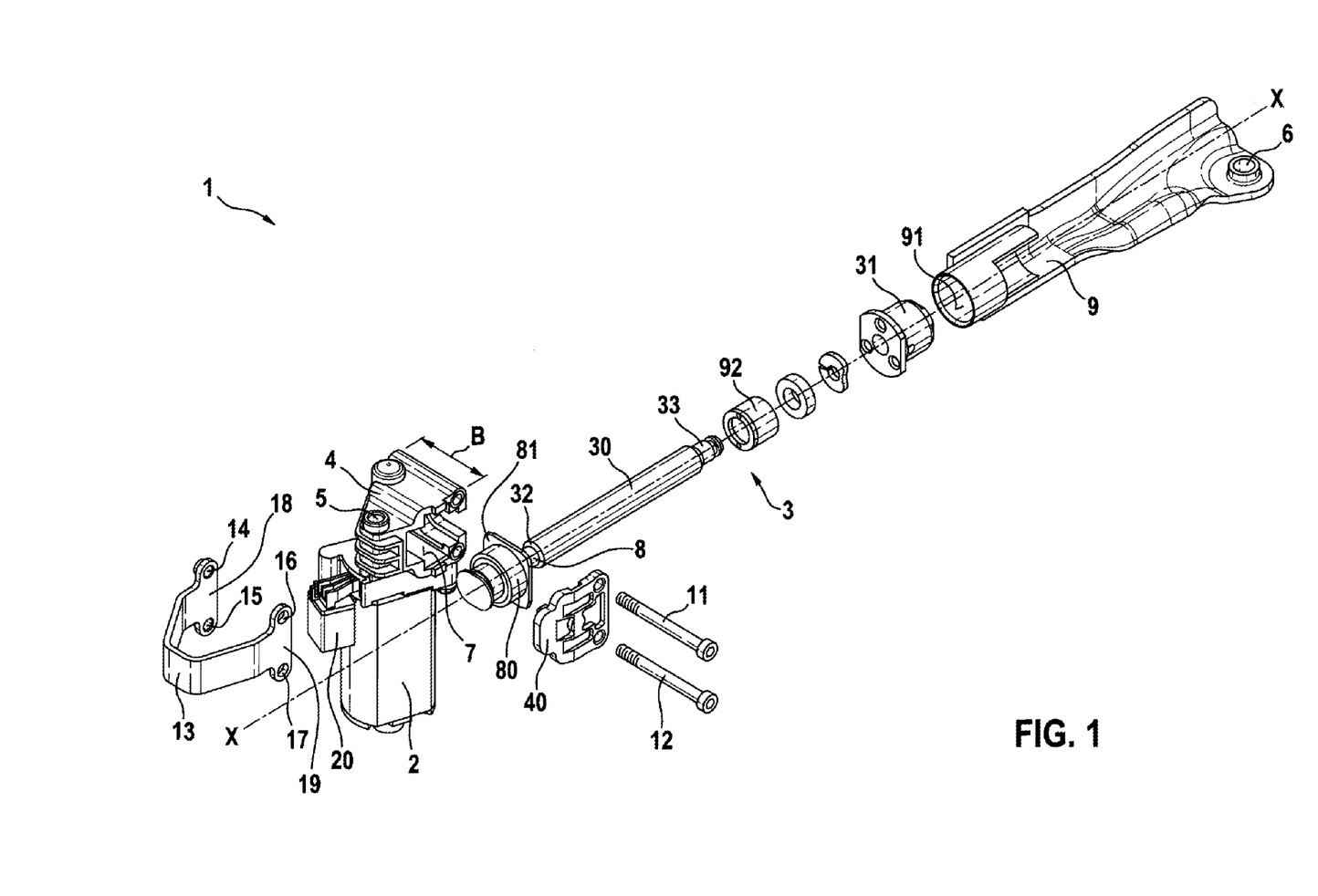
FIG. 1 shows a perspective, schematic exploded view of a transmission drive unit according to the invention of a seat adjusting device according to a first exemplary embodiment.
Figure 2:
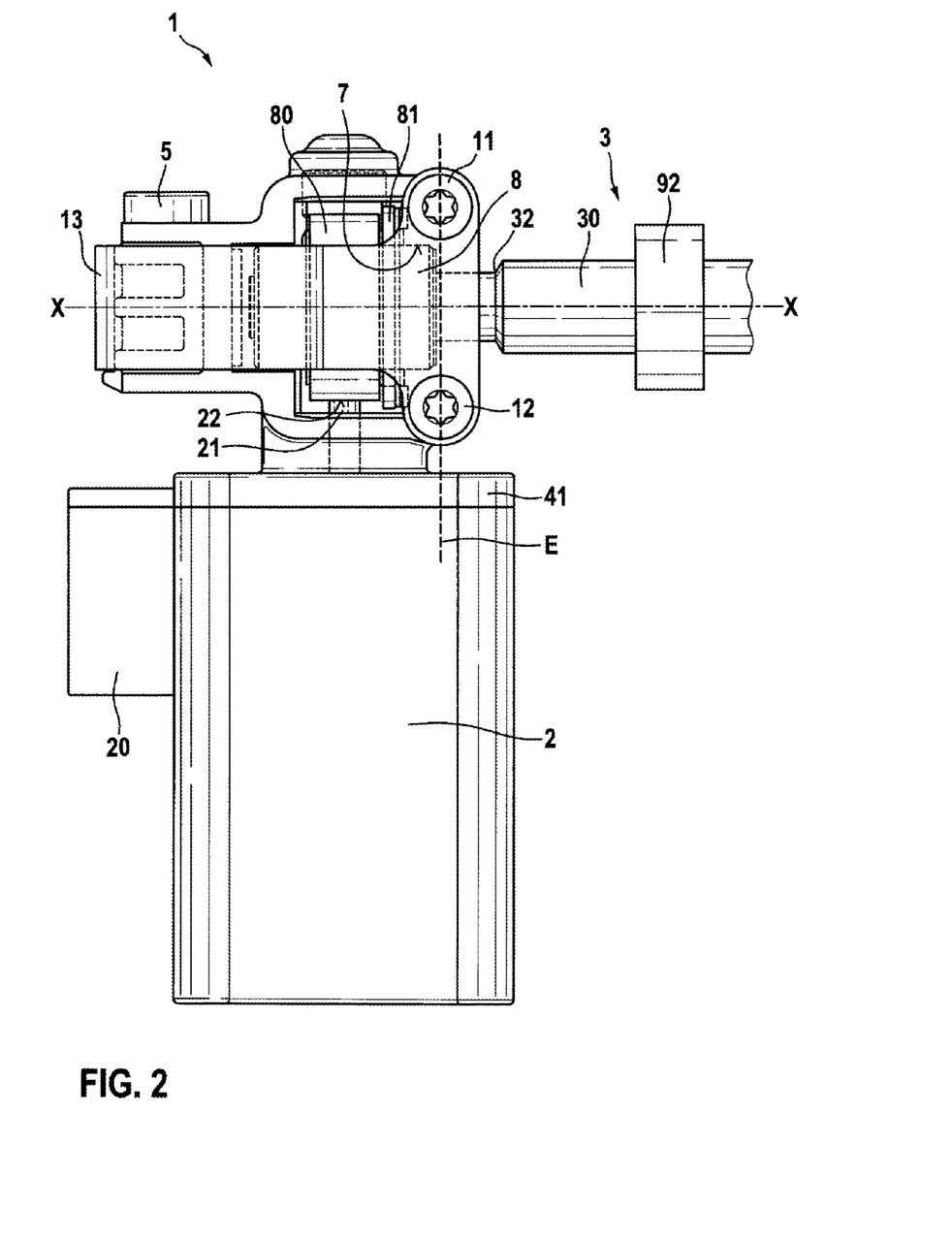
FIG. 2 shows a schematic side view of the transmission drive unit of FIG. 1.

With reference to FIGS. 1 and 2, a transmission drive unit 1 of a seat adjusting device of a first exemplary embodiment is described in detail hereinafter.

As visible from FIG. 1, the transmission drive unit 1 comprises an electrical drive motor 2 on which a plug connector 20 for an electrical connection is arranged. The transmission drive unit 1 further comprises a spindle drive 3 with a spindle 30, an end stop 92 and a nut 31. The spindle 30 is in engagement with an output shaft 21 of the drive motor 2 via a worm gear 80, so that by actuating the drive motor the spindle 30 may be rotated. By means of the nut 31 fixed to a connecting component 9, therefore, an adjustment of a seat in the axial direction X-X of the spindle 30 may be permitted.

The transmission drive unit 1 further comprises a housing 4 produced from plastics. The housing 4 comprises a connecting region 41 on which the drive motor 2 is arranged. The housing further comprises a first bearing surface 7 which serves for mounting the spindle 30. The spindle 30 comprises in this case a bearing element 8 which is preferably also produced from plastics. Furthermore, the transmission drive unit 1 comprises a second bearing surface 22 which serves for bearing the output shaft 21 of the drive motor 2. The housing 4 further comprises a first customer interface 5 which, for example, is configured as a through-hole in the plastics housing 4, said through-hole being able to receive an hinge pin in a rotatable manner.

A cover 40 produced from plastics is further provided. The cover 40 is preferably produced from the same plastics as the housing 4. The cover 40 is fixed by means of a first metal screw bolt 11 and a second metal screw bolt 12 on the one-piece housing 4.

As visible from FIG. 1, the two metal screw bolts 11, 12 additionally fix a further C-shaped reinforcing element 13 which surrounds the one-piece housing 4 as a cage. The reinforcing element 13 is produced from a metal material and comprises four openings 14, 15, 16, and 17 on a first and second end region 18, 19, threads preferably being cut therein on one side. This enables a secure connection to the two screw bolts 11, 12.

The two screw bolts 11, 12 are located in a common plane E which is located approximately perpendicular to the axial direction X-X of the spindle 30.

As visible from FIG. 2, the two screw bolts 11, 12 in the axial direction X-X of the spindle 30 are arranged between a threaded end 32 of the spindle 30 and the first bearing surface 7 on the one-piece housing 4. The end 32 of the spindle 30 extends in this case between the two screw bolts 11, 12. Moreover, a disk-shaped worm gear-axial stop 81 is arranged between the worm gear 20 and the bearing element 8. As the screw bolts 11, 12 extend perpendicular to the axial direction X-X of the spindle 30, and extend over the entire width B of the one-piece housing 4, an increase in strength may be achieved by covering the screw bolts 11, 12 and the worm gear-axial stop 81. In the case of an accident, the worm gear 80 is supported via the worm gear-axial stop 81 on the screw bolts 11, 12, as in the axial direction X-X a covering between the worm gear-axial stop 81 and the screw bolts 11, 12 is present. As a result, a high degree of stability may be achieved, for example in the case of an accident.

At the other free end 33 of the spindle 30, the nut 31 is mounted on a third bearing surface 91 on a connecting component 9, which forms a second bearing of the spindle 30. The connecting component 9 comprises a second interface 6 for connecting to a seat of a vehicle.

The reinforcing element 13 encloses the housing 4 by means of a transition fit or by means of a clearance fit so that no forces may be exerted on the housing 4 by the reinforcing element 13 itself. As a result, no pressure is exerted on the bearing points and thus jamming of the worm gear 32 is prevented. By the provision of the four openings 14, 15, 16, 17, the reinforcing element 13 may be fixed transversely to the longitudinal axis X-X of the spindle 30 on the housing 4.

The screw bolts 11, 12 may also be designed such that they are provided as self-tapping screws in order to cut a thread in the reinforcing element 13 during mounting. In addition, the thread may alternatively already be present in the reinforcing element.

Moreover, an increase in strength may be achieved by the immediately adjacent arrangement of the two screw bolts 11, 12 relative to the first bearing surface 7.

According to the invention, therefore, operating forces and crash forces occurring in the event of an accident may be conducted via a customer bolt (not shown), which is inserted in the first interface 5, from the plastics housing 4 via the reinforcing element 13 and the bolt 11, 12 onto the spindle 30 and via the nut 31 into the connecting component 9 and from there back into the seat structure.

Moreover, the housing 4 produced from plastics ensures that noise is not transmitted from the drive motor 2 into the seat.

Moreover, according to the invention, by the use of the plastics housing 4 the number of different parts may be reduced in comparison with the prior art, thus also resulting in a cost reduction. For the first customer interface 5, the plastics housing 4 may simply be varied, wherein for the reinforcing cage the same reinforcing element 13 is always able to be used with the corresponding screw bolts 11, 12, 29. Moreover, the transmission drive unit 1 according to the invention has increased robustness in terms of production technology. This also results in a simpler construction and simplified production and mounting.

Figure 3:
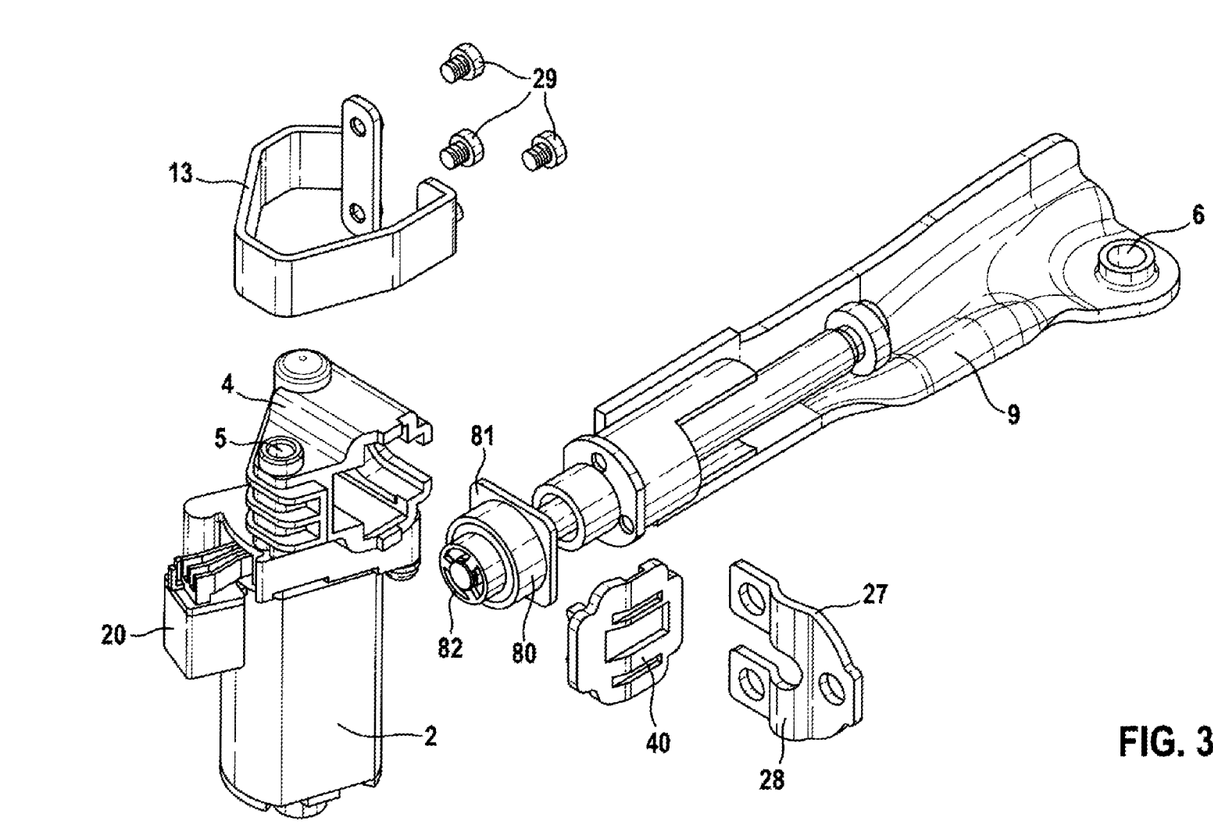
FIG. 3 shows a perspective, schematic exploded view of a transmission drive unit according to the invention according to a second exemplary embodiment of the invention.
Figure 4:
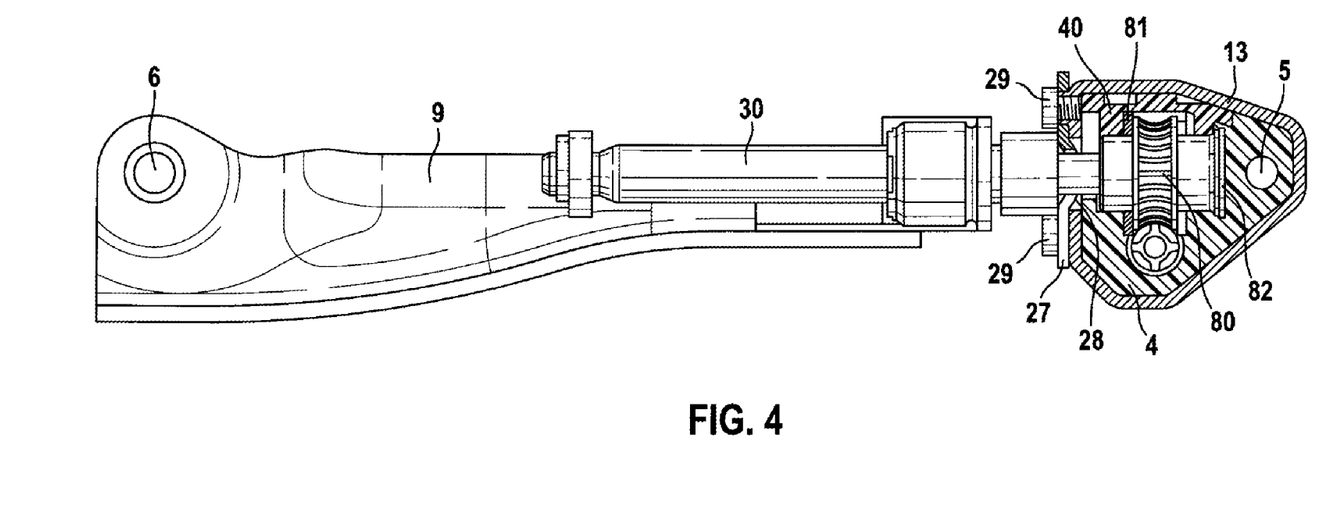
FIG. 4 shows a schematic sectional view of the transmission drive unit of FIG. 3.
Figure 5:
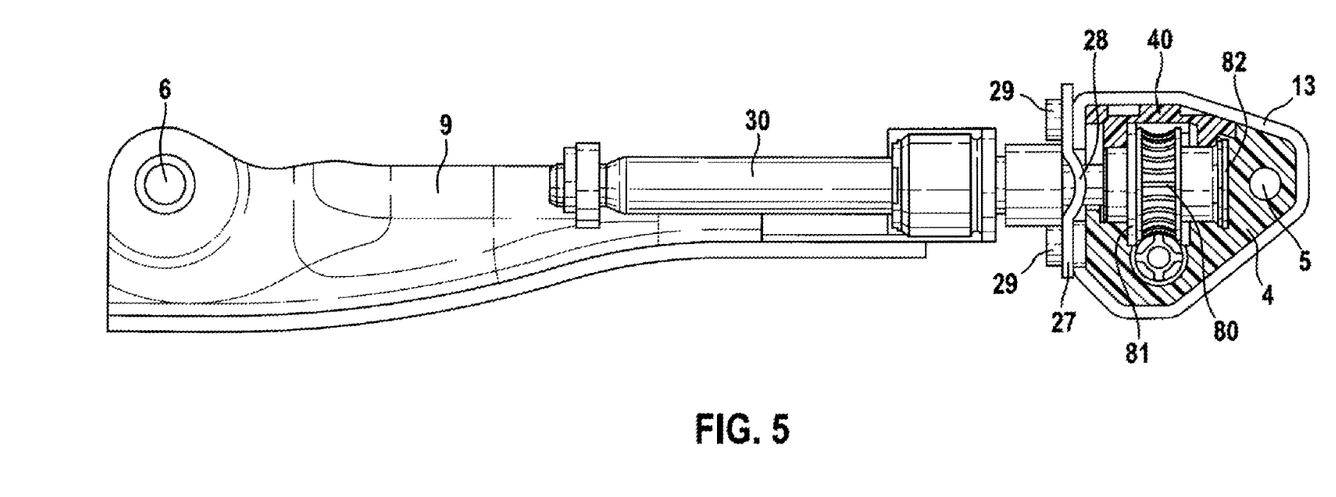
FIG. 5 shows a detailed view which illustrates a cage arranged around a plastics housing.

With reference to FIGS. 3 to 5, a transmission drive unit 1 according to a second exemplary embodiment is described in detail hereinafter.

In contrast to the first exemplary embodiment in the second exemplary embodiment, the cover 40 which closes the housing produced from plastics 4 is fixed by means of a cage arrangement, comprising the reinforcing element 13, a disk-shaped support component 27 and a plurality of screw bolts 29. The cage in this case is arranged in the axial direction X-X such that forces which occur in the axial direction X-X are absorbed. Moreover, a spring region 28 is provided on the disk-shaped support element 27, said spring region in this exemplary embodiment being configured as a bead. The disk-shaped support component 27 is designed to be U-shaped and the spindle is guided through the disk-shaped support component 27 (see FIGS. 4 and 5). A disk 82 is provided at the free end of the spindle 30, said disk being supported on the housing 4. By the provision of the first customer interface 5 in the housing 4 tolerances may be reduced and free clearance between the components reduced. If in the case of an accident crash forces act on the unit, said forces for example being introduced into the unit via the second customer interface 6, these forces are transmitted via the spindle 30 to the worm gear 80, and from there via the disks 81 or 82 onto the plastics housing on which the first customer interface 5 is provided. As the components of the cage, i.e. the reinforcing element 13, the disk-shaped support component 27 and the screw bolts 29, are produced from metal material, greater forces may be absorbed in this case. If tensile forces act on the spindle 30, the forces from the worm gear 80 via the axial stop disk 81 are transmitted to the support component 27. As a result, the first customer interface 5, which is directly configured in the plastics housing 4, is also secured inside the reinforcing cage (preferably made from metal) against being pulled out. As the disk-shaped support component 27 has the spring region 28, additional resilient properties may be gained during an accident for damping purposes.

According to the invention, therefore, the functional regions for the transmission of force in normal operation may be separated from the regions which in the case of an accident absorb forces. As a result, the respective components may be optimally designed for the respective function thereof.

What is claimed is:

1. A transmission drive unit (1) of a seat adjusting device comprising:
   an electrical drive motor (2),
   a spindle drive (3) comprising a spindle (30) which is configured to be driven by the drive
   motor (2) and a nut (31) which is connected to a first seat component,
   a housing (4), wherein the housing (4) is produced from a plastic material, the housing (4) including a first interface (5) configured to be attached to a second seat component, wherein the first interface (5) includes a through-hole extending through the plastic housing (4) and configured to receive a hinge pin, and the housing (4) further includes a first bearing surface (7) bearing the spindle (30) of the spindle drive (3), and
   a metallic reinforcing element (13) arranged on an outer face of the housing (4) and extending partially around the first interface (5).

2. The unit according to claim 1, further comprising a second bearing surface (22) on the housing (4), said second bearing surface bearing an output shaft (21) of the drive motor (2).

3. The unit according to claim 1, further comprising a cover (40) closing the housing (4), wherein the cover (40) is produced from plastic.

4. The unit according to claim 3, characterized in that the cover (40) is fixed to the housing (4) by a first metal screw bolt (11) and a second metal screw bolt (12), wherein a longitudinal axis of the spindle (30) intersects in a perpendicular manner a plane (E) in which the first and second screw bolts (11, 12) are located.

5. The unit according to claim 4, characterized in that the first and second screw bolts (11, 12) extend over an entire width (B) of the housing (4).

6. The unit according to claim 4, characterized in that the first and second screw bolts (11, 12) are arranged relative to an axial direction (X-X) of the spindle (30) between a first spindle end (32) and the first bearing surface (7) on the housing (4).

7. The unit according to claim 4, further comprising a worm gear-axial stop (81) which is arranged on the spindle (30), wherein the spindle (30) extends along a first, axial direction (X-X), wherein the worm gear-axial stop (81) extends along a second direction that is perpendicular to the axial direction (X-X), wherein the worm gear-axial stop (81) extends a distance along the second direction that is greater than a distance between the first and second screw bolts along the second direction, such that the worm gear-axial stop (81) at least partially covers the first and second screw bolts along the first, axial direction (X-X).

8. The unit according to claim 4, further comprising a worm gear-axial stop (81) which is arranged on the spindle (30), wherein a complete covering is present relative to an axial direction (X-X) between the first and second screw bolts and the worm gear-axial stop (81).

9. The unit according to claim 8, further comprising a reinforcing element (13) made of metal arranged on an outer face of the housing (4).

10. The unit according to claim 9, characterized in that a transition fit or a clearance fit is formed between the reinforcing element (13) and the housing (4).

11. The unit according to claim 9, characterized in that the reinforcing element (13) is substantially C-shaped, with a first end region (18) and a second end region (19), wherein the first and second screw bolts (11, 12) connect the first and second end regions (18, 19) together.

12. The unit according to claim 9, further comprising a disk-shaped support component (27) made of metal, which together with the reinforcing element (13) encloses the housing (9).

13. The unit according to claim 12, characterized in that the disk-shaped support element (27) has a spring region (28).

14. The unit according to claim 12, characterized in that the reinforcing element (13) and the disk-shaped support component (27) are connected by screw bolts (29) extending in an axial direction (X-X) of the spindle, wherein the spindle extends through the disk-shaped support element (27) and the worm gear-axial stop (81) is arranged inside the disk-shaped support component (27) and the reinforcing element (13).

15. The unit according to claim 1, characterized in that a transition fit or a clearance fit is formed between the reinforcing element (13) and the housing (4).

16. The unit according to claim 1, characterized in that the reinforcing element (13) is substantially C-shaped, with a first end region (18) and a second end region (19), wherein first and second screw bolts (11, 12) connect the first and second end regions (18, 19) together.

17. The unit according to claim 1, further comprising a disk-shaped support component (27) which together with the reinforcing element (13) encloses the housing (9).

18. The unit according to claim 17, characterized in that the disk-shaped support element (27) has a spring region (28).

19. The unit according to claim 17, characterized in that the reinforcing element (13) and the disk-shaped support component (27) are connected by screw bolts (29) extending in an axial direction (X-X) of the spindle, wherein the spindle extends through the disk-shaped support element (27).

20. A transmission drive unit (1) of a seat adjusting device comprising:
   an electrical drive motor (2),
   a spindle drive (3) comprising a spindle (30) which is configured to be driven by the drive motor (2) and a nut (31) which is connected to a first seat component,
   a housing (4), wherein the housing (4) is produced from a plastic material, the housing (4) including a first interface (5) configured to be attached to a second seat component, and the housing (4) including first bearing surface (7) bearing the spindle (30) of the spindle drive (3), a cover (40) closing the housing (4), wherein the cover (40) is produced from plastic, wherein the cover (40) is fixed to the housing (4) by a first metal screw bolt (11) and a second metal screw bolt (12), wherein a longitudinal axis of the spindle (30) intersects in a perpendicular manner a plane (E) in which the first and second screw bolts (11, 12) are located, and a worm gear-axial stop (81) which is arranged on the spindle (30), wherein the spindle (30) extends along a first, axial direction (X-X), wherein the worm gear-axial stop (81) extends along a second direction that is perpendicular to the axial direction (X-X), wherein the worm gear-axial stop (81) extends a distance along the second direction that is greater than a distance between the first and second screw bolts along the second direction, such that the worm gear-axial stop (81) at least partially covers the first and second screw bolts along the first, axial direction (X-X).

21. A transmission drive unit (1) of a seat adjusting device comprising:

an electrical drive motor (2), a spindle drive (3) comprising a spindle (30) which is configured to be driven by the drive motor (2) and a nut (31) which is connected to a first seat component, a housing (4), wherein the housing (4) is produced from a plastic material, the housing (4) including a first interface (5) configured to be attached to a second seat component, and the housing (4) including first bearing surface (7) bearing the spindle (30) of the spindle drive (3), and a reinforcing element (13) arranged on an outer face of the housing (4), wherein the reinforcing element (13) is substantially C-shaped, with a first end region (18) and a second end region (19), wherein first and second screw bolts (11, 12) connect the first and second end regions (18, 19) together.

* * * * *